(12) United States Patent
Barber et al.

(10) Patent No.: US 12,103,418 B2
(45) Date of Patent: Oct. 1, 2024

(54) ELECTRIC VEHICLE CHARGING OPTIMIZATION BASED ON PREDICTIVE ANALYTICS UTILIZING MACHINE LEARNING

(71) Applicant: International Business Machines Corporation, Armonk, NY (US)

(72) Inventors: Ronald J. Barber, San Jose, CA (US); Chad Eric DeLuca, Morgan Hill, CA (US); Rishabh Anup Nair, Pleasanton, CA (US); Uche Uba, Hawaiian Gardens, CA (US); Saisujit Madiraju, San Jose, CA (US); Niranjan Abhijeet Mirashi, San Jose, CA (US); Francisco Loya, Antioch, CA (US); Emmanuel Shedu, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 16/998,833

(22) Filed: Aug. 20, 2020

(65) Prior Publication Data

US 2022/0055496 A1 Feb. 24, 2022

(51) Int. Cl.
*B60L 9/00* (2019.01)
*B60L 53/16* (2019.01)
(Continued)

(52) U.S. Cl.
CPC ............ *B60L 53/62* (2019.02); *B60L 53/16* (2019.02); *G06N 20/00* (2019.01); *G08G 1/017* (2013.01); *G08G 1/143* (2013.01); *H02J 7/0047* (2013.01)

(58) Field of Classification Search
CPC ......... B60L 53/62; B60L 53/16; G06N 20/00; G08G 1/017; G08G 1/143; H02J 7/0047
See application file for complete search history.

(56) References Cited

U.S. PATENT DOCUMENTS 8,717,170 B1 5/2014 Juhasz
8,890,475 B1 * 11/2014 Becker ................... B60L 53/66
320/109
(Continued)

FOREIGN PATENT DOCUMENTS

CA 3104595 A1 * 12/2019 ............ B60L 53/665
CN 106515480 B 2/2019

OTHER PUBLICATIONS

Farid, A.M., "A hybrid dynamic system model for multimodal transportation electrification." IEEE Transactions on Control Systems Technology 25.3, 2016, pp. 940-951, IEEE, United States.
(Continued)

*Primary Examiner* — Adam M Alharbi
(74) *Attorney, Agent, or Firm* — Stosch Sabo (57) ABSTRACT

A method for managing charging resources of a charging system for plug-in electric vehicles (PEVs), the charging system including a central recording center including a tracking database. The method including initiating a charging session to a first PEV based on detecting that the first PEV has been plugged into a charging station. The first PEV is associated with the charging session in the tracking database. The first PEV is associated, in the tracking database, to a first user and a first PEV profile. The first PEV is charged in accordance with information from the first PEV profile. Charging session data is monitored and stored in the tracking database during the charging session. A machine learning model is generated based on collective charging data. Charge completion time of the first PEV is predicted based on the machine learning model.

12 Claims, 9 Drawing Sheets

(51) Int. Cl.
*B60L 53/62* (2019.01)
*G06N 20/00* (2019.01)
*G08G 1/017* (2006.01)
*G08G 1/14* (2006.01)
*H02J 7/00* (2006.01)

(56) References Cited

U.S. PATENT DOCUMENTS

| | | | |
|---|---|---|---|
| 9,139,091 | B1 | 9/2015 | Penilla et al. |
| 10,042,359 | B1* | 8/2018 | Konrardy ............... G06F 30/20 |
| 10,336,206 | B2 | 7/2019 | Uyeki et al. |
| 2014/0021908 | A1 | 1/2014 | McCool et al. |
| 2016/0297316 | A1* | 10/2016 | Penilla ............... G06Q 30/0232 |
| 2018/0105051 | A1* | 4/2018 | Zheng ............... G06Q 20/3276 |
| 2019/0118655 | A1* | 4/2019 | Grimes ................ B60W 20/13 |
| 2019/0344680 | A1* | 11/2019 | Beaude .................. B60L 53/63 |
| 2019/0389315 | A1* | 12/2019 | Zhu ........................ B60L 53/62 |
| 2021/0206286 | A1* | 7/2021 | Choi ....................... B60L 53/68 |

OTHER PUBLICATIONS

Andrenacci, N. et al., "Comparison of different scenarios of users distribution among charging infrastructure in an urban area." 2019 AEIT International Conference of Electrical and Electronic Technologies for Automotive (AEIT Automotive), 2019, pp. 1-6, United States.

Van Der Wardt, TJT, et al., "A hybrid dynamic system assessment methodology for multi-modal transportation-electrification." Energies 10.5, 2017, pp. 1-25.

Babic, J. et al. "Extending parking lots with electricity trading agent functionalities." Workshop on Agent-Mediated Electronic Commerce and Trading Agent Design and Analysis (AMEC/TADA 2015)@ AAMAS, 2015, pp. 1-14, Istanbul, Turkey.

Mell, P., et al., "The NIST Definition of Cloud Computing", National Institute of Standards and Technology Special Publication 800-145, Sep. 2011, pp. 1-7, U.S. Department of Commerce, United States.

Lee, Z.J et al., "Large-Scale Adaptive Electric Vehicle Charging," 2018 IEEE International Conference on Communications, Control, and Computing Technologies for Smart Grids (SmartGridComm), Nov. 2018, pp. 1-7, United States.

Lee, G. et al., "Adaptive charging network for electric vehicles," 2016 IEEE Global Conference on Signal and Information Processing (GlobalSIP), Dec. 7, 2016, pp. 891-895, IEEE, United States.

Diaz, C. et al., "Smart Charge of an Electric Vehicles Station: A Model Predictive Control Approach," 2018 IEEE Conference on Control Technology and Applications (CCTA), Oct. 29, 2018, pp. 54-59, Copenhagen, Denmark.

Quarebagh, A.J et al., "Optimized Scheduling for Solving Position Allocation Problem in Electric Vehicle Charging Stations," 2019 27th Iranian Conference on Electrical Engineering (ICEE), Aug. 5, 2019, pp. 593-597, IEEE, Iran.

* cited by examiner

ELECTRIC VEHICLE CHARGING OPTIMIZATION BASED ON PREDICTIVE ANALYTICS UTILIZING MACHINE LEARNING

BACKGROUND

The field of embodiments of the present invention relates to electric vehicle (EV) charging including optimization based on predictive analytics utilizing machine learning.

EV Charging is a constrained and fixed resource in terms of available "plugs." Optimizing a fair utilization of this resource is challenging and costly in terms of time by users to manually monitor availability or salaries paid to a valet to perform such actions on user's behalf.

Pre-Activation sign-in systems (e.g., CHARGEPOINT®) can enforce "Idle Fees" that charge users who let a plug-in EV (PEV) sit while being plugged in for an extended period of time. This can be problematic in a workplace setting where users may be conducting a meeting or be on calls and not be able to service their vehicle in a timely manner. Additionally, while such systems do promote moving vehicles, they do not allow third-party activation of charging for waiting vehicles as they would require a pre-activation sign-in. Other techniques to reduce idle times and improve utilization have valets monitor the system with their obvious costs, and some users may not feel comfortable leaving their vehicles with a valet.

SUMMARY

Embodiments relate to EV charging including optimization based on predictive analytics utilizing machine learning (ML). One embodiment provides a method for managing charging resources of a charging system for plug-in electric vehicles (PEVs), the charging system including a central recording center including a tracking database. The method further includes initiating a charging session to a first PEV based on detecting that the first PEV has been plugged into a charging station. The method additionally includes that the first PEV is associated with the charging session in the tracking database. The method further includes that the first PEV is associated, in the tracking database, to a first user and a first PEV profile. The method also includes that the first PEV is charged in accordance with information from the first PEV profile. The method further includes that charging session data is monitored and stored in the tracking database during the charging session. The method additionally includes that a machine learning model is generated based on collective charging data. The method further includes that charge completion time of the first PEV is predicted based on the machine learning model. The embodiments significantly contribute to PEV users that need to charge their PEV but cannot immediately plug-in due to capacity of others at charging stations. Some features contribute to the advantage of notifying queued PEV owners to provide them the opportunity to move a plug.

One or more of the following features may be included. In some embodiments, the information of the first PEV profile includes identifying data and technical information needed for activating and managing charging operations.

In some embodiments, the method may further include that the identifying data includes license plate number or manufacturer vehicle identification number. In one embodiment, the technical information includes PEV: manufacturer, model, year, and battery size.

In some embodiments, the method may additionally include forming the collective charging data based on associating the charging session data with similar data stored in previous charging sessions of additional PEVs having characteristics similar to the first PEV profile.

In one or more embodiments, the method may include notifying the first user of the predicted charge completion time of the first PEV.

In some embodiments, the method may further include collecting user behavior information, and rewarding some users with early notification of charging station availability and optimal waiting location identification. In one embodiment, the user is a vehicle owner.

In one or more embodiments, the method may additionally include notifying a second user of predicted availability of the charging station based on the predicted charge completion time of the first PEV.

In some embodiments, the method may further include that the notifying further identifies a parking location having a predicted earliest probable availability for the charging station.

These and other features, aspects and advantages of the present embodiments will become understood with reference to the following description, appended claims and accompanying figures.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to electric vehicle (EV) charging including optimization based on predictive analytics utilizing machine learning (ML). One embodiment provides a method for managing charging resources of a charging system for plug-in electric vehicles (PEVs), the charging system including a central recording center including a tracking database. The method further includes initiating a charging session to a first PEV based on detecting that the first PEV has been plugged into a charging station. The method additionally includes that the first PEV is associated with the charging session in the tracking database. The method further includes that the first PEV is associated, in the tracking database, to a first user and a first PEV profile. The method also includes that the first PEV is charged in accordance with information from the first PEV profile. The method further includes that charging session data is monitored and stored in the tracking database during the charging session. The method additionally includes that a machine learning model is generated based on collective charging data. The method further includes that charge completion time of the first PEV is predicted based on the machine learning model. The embodiments significantly contribute to PEV users that need to charge their PEV but cannot immediately plug-in due to capacity of others at charging stations. Some features contribute to the advantage of notifying queued PEV owners to provide them the opportunity to move a plug.

Artificial intelligence (AI) models may include a trained ML model (e.g., models, such as a neural network (NN), a convolutional NN (CNN), a recurrent NN (RNN), a Long short-term memory (LSTM) based NN, gate recurrent unit (GRU) based RNN, tree-based CNN, self-attention network (e.g., an NN that utilizes the attention mechanism as the basic building block; self-attention networks have been shown to be effective for sequence modeling tasks, while having no recurrence or convolutions), BiLSTM (bi-directional LSTM), etc.). An artificial NN is an interconnected group of nodes or neurons.

A NN is a series of algorithms that have a goal to recognize underlying relationships in a set of data through a process that acts similarly as to the way the human brain works. In this sense, NNs refer to systems of neurons, either organic or artificial in nature. NNs can adapt to changing input; so the network generates the best possible result without needing to redesign the output criteria.

Deep learning (also known as deep structured learning or differential programming) is part of a broader family of ML methods based on NNs with representation learning. Learning can be supervised, semi-supervised or unsupervised.

An RNN is a class of artificial NNs where connections between nodes form a directed graph along a temporal sequence. This allows it to exhibit temporal dynamic behavior. Derived from feedforward NNs, RNNs can use their internal state (memory) to process variable length sequences of inputs. This makes DNNs applicable to tasks such as unsegmented, connected handwriting recognition or speech recognition.

For expository purposes, the terms "EV," "PEV," "hybrid EV" (HEV), "plug-in HEV (PHEV)," "range extended EV" (REEV), "battery EV" (BEV), "vehicle," and "car" may be replaced or used interchangeably in this specification.

It is understood in advance that although this disclosure includes a detailed description of cloud computing, implementation of the teachings recited herein are not limited to a cloud computing environment. Rather, embodiments of the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as Follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 1:
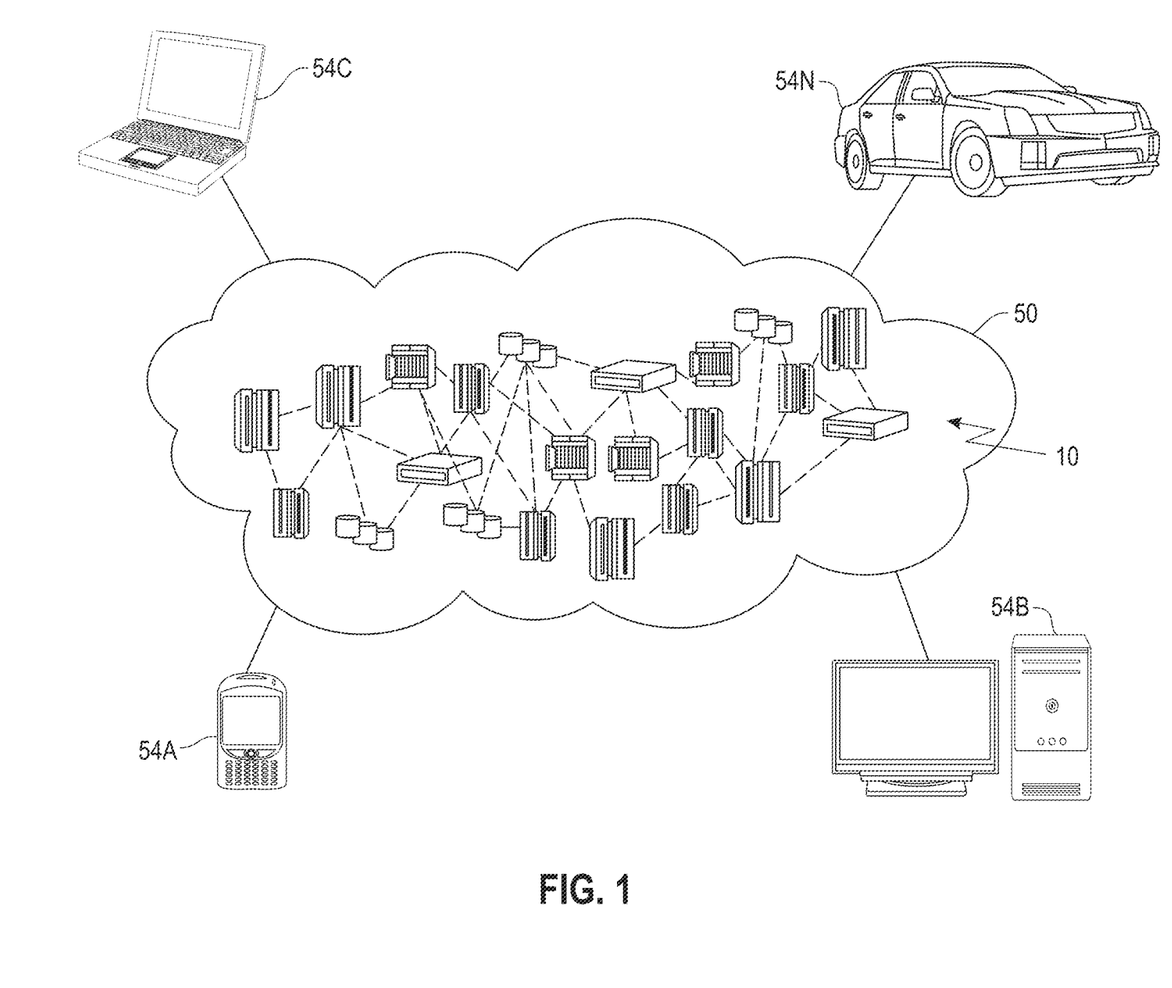
FIG. 1 depicts a cloud computing environment, according to an embodiment.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
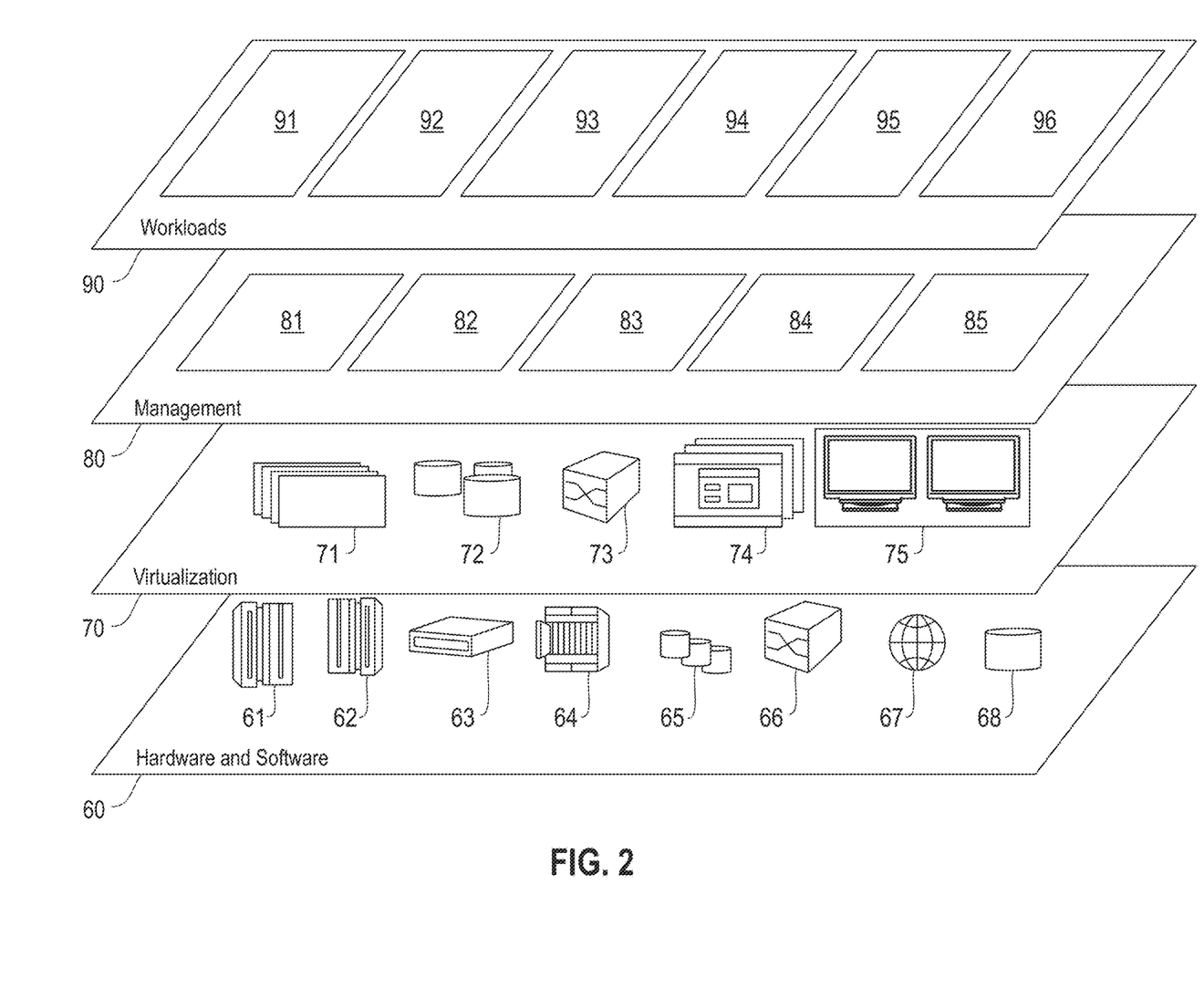
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for EV charging including optimization based on predictive analytics utilizing ML processing 96 (see, e.g., system 500, FIG. 5, system 700, FIG. 7, process 800, FIG. 8 and process 900, FIG. 9). As mentioned above, all of the foregoing examples described with respect to FIG. 2 are illustrative only, and the embodiments are not limited to these examples.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 3:
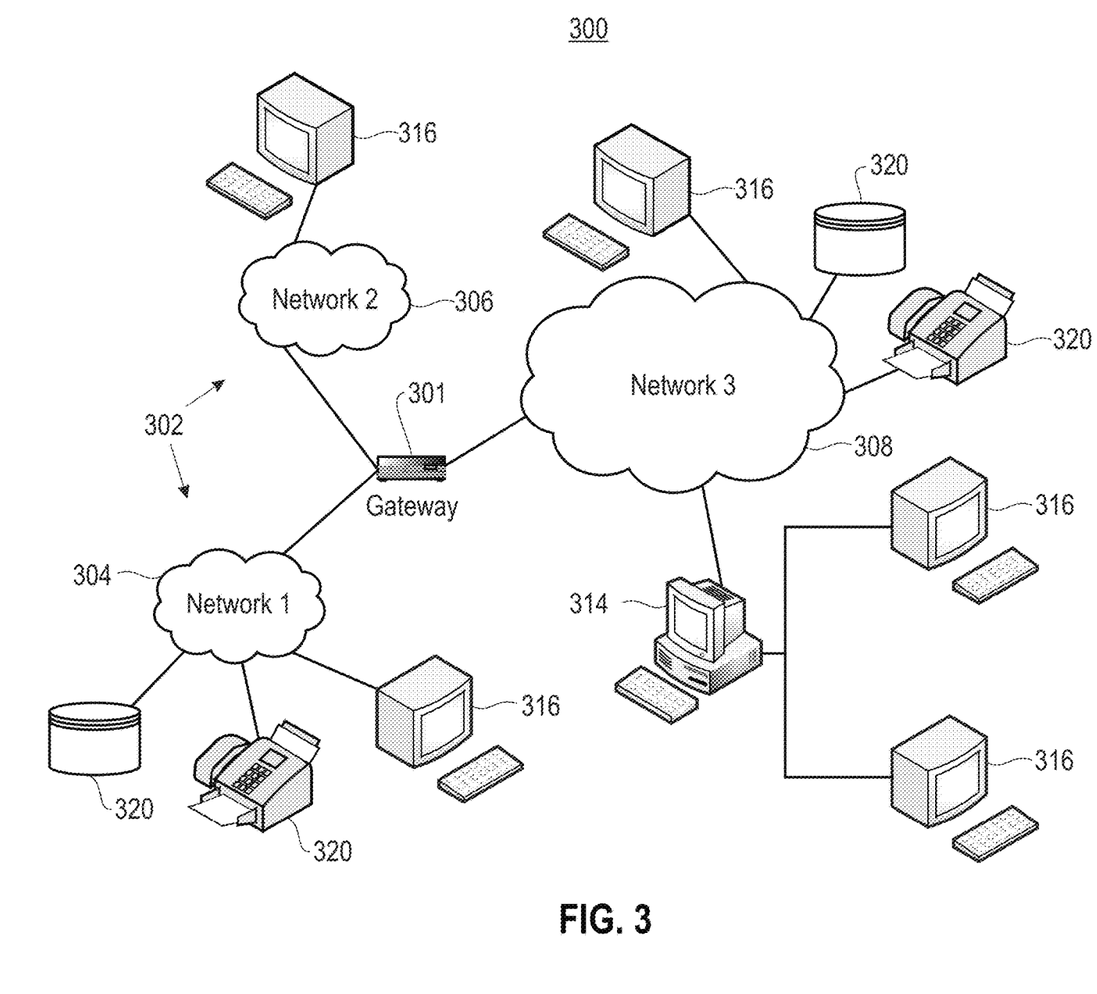
FIG. 3 is a network architecture of a system for EV charging including optimization based on predictive analytics utilizing machine learning (ML) processing, according to an embodiment.

FIG. 3 is a network architecture of a system 300 for EV charging including optimization based on predictive analytics utilizing ML processing, according to an embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX® system that emulates an IBM® z/OS environment, a UNIX® system that virtually hosts a MICROSOFT® WINDOWS® environment, a MICROSOFT® WINDOWS® system that emulates an IBM® z/OS environment, etc. This virtualization and/or emulation may be implemented through the use of VMWARE® software in some embodiments.

Figure 4:
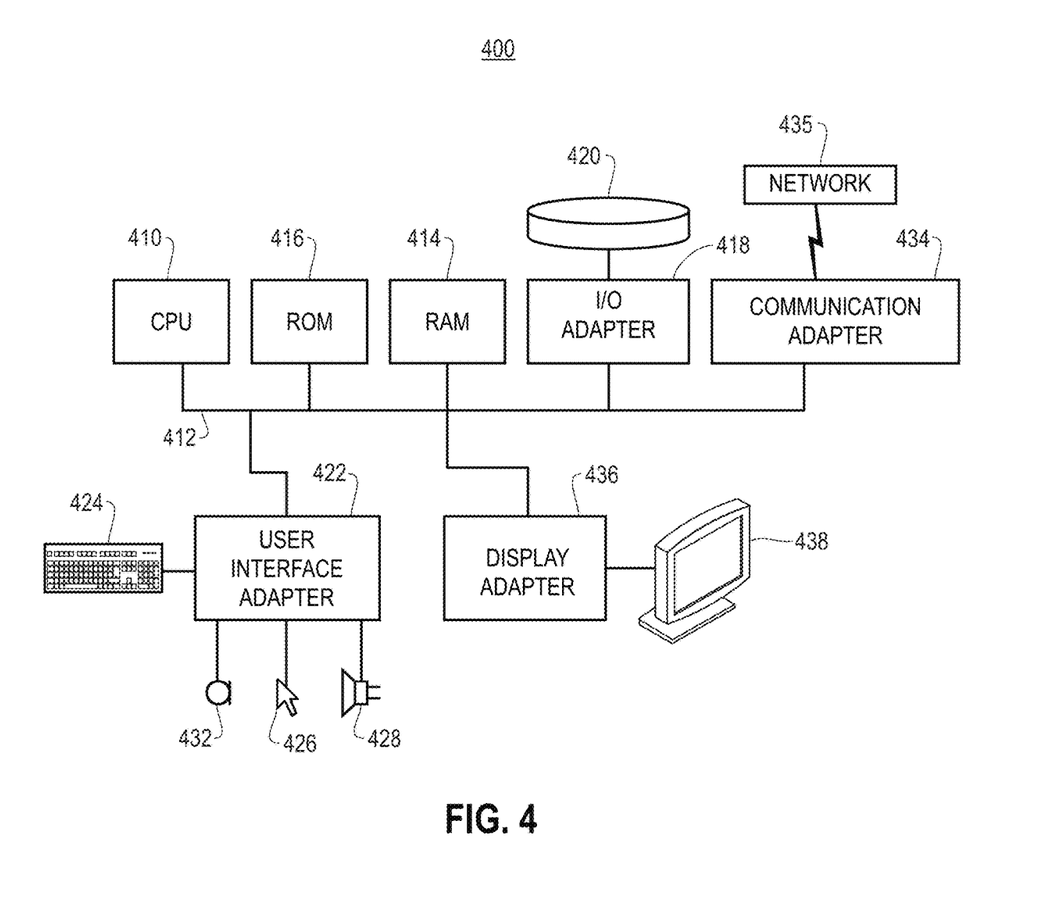
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT® WINDOWS® Operating System (OS), a MAC OS®, a UNIX® OS, etc. In one embodiment, the system 400 employs a POSIX® based file system. It will be appreciated that other examples may also be implemented on platforms and operating systems other than those mentioned. Such other examples may include operating systems written using JAVA®, XML, C, and/or C++ language, or other programming languages, along with an object oriented programming methodology. Object oriented programming (OOP), which has become increasingly used to develop complex applications, may also be used.

Figure 5:
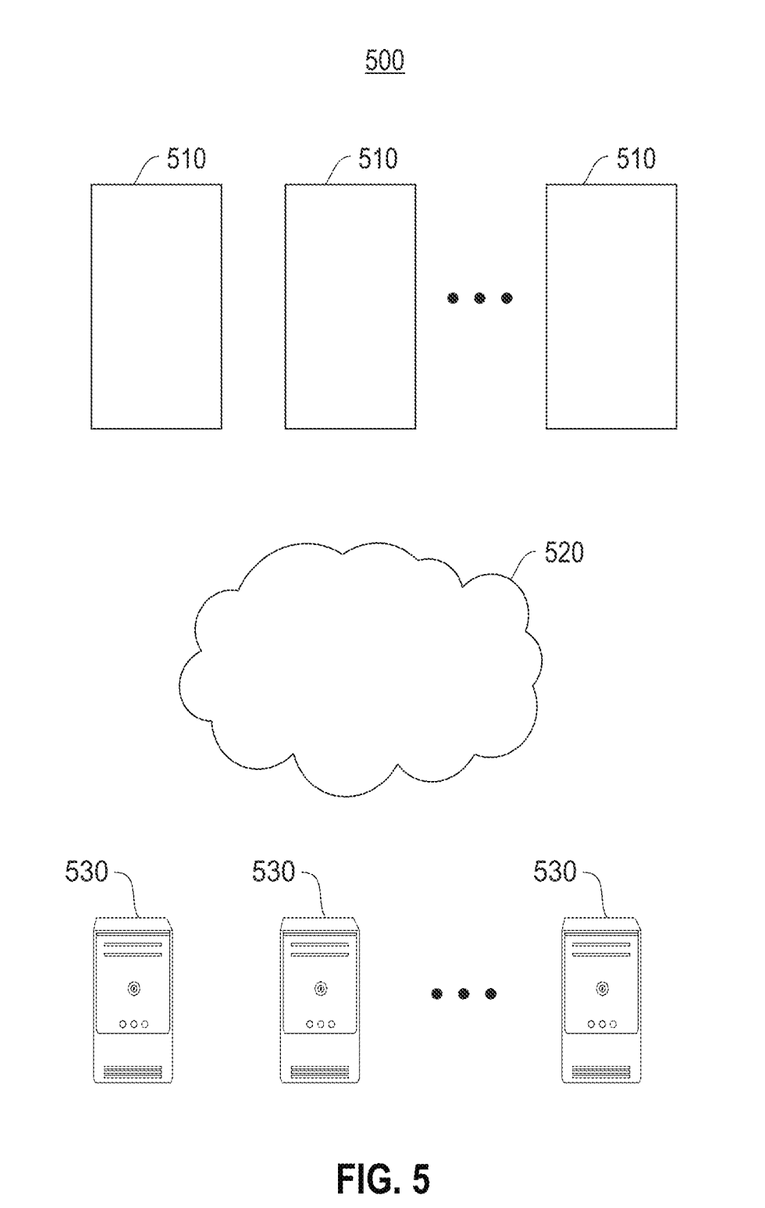
FIG. 5 is a block diagram illustrating a distributed system for EV charging including optimization based on predictive analytics utilizing ML processing, according to one embodiment.

FIG. 5 is a block diagram illustrating a distributed system 500 for EV charging including optimization based on predictive analytics utilizing ML processing, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a data center, etc.), and servers 530. In one embodiment, the client devices 510 are provided with cloud services from the servers 530 through the cloud or resource sharing environment 520.

Figure 6:
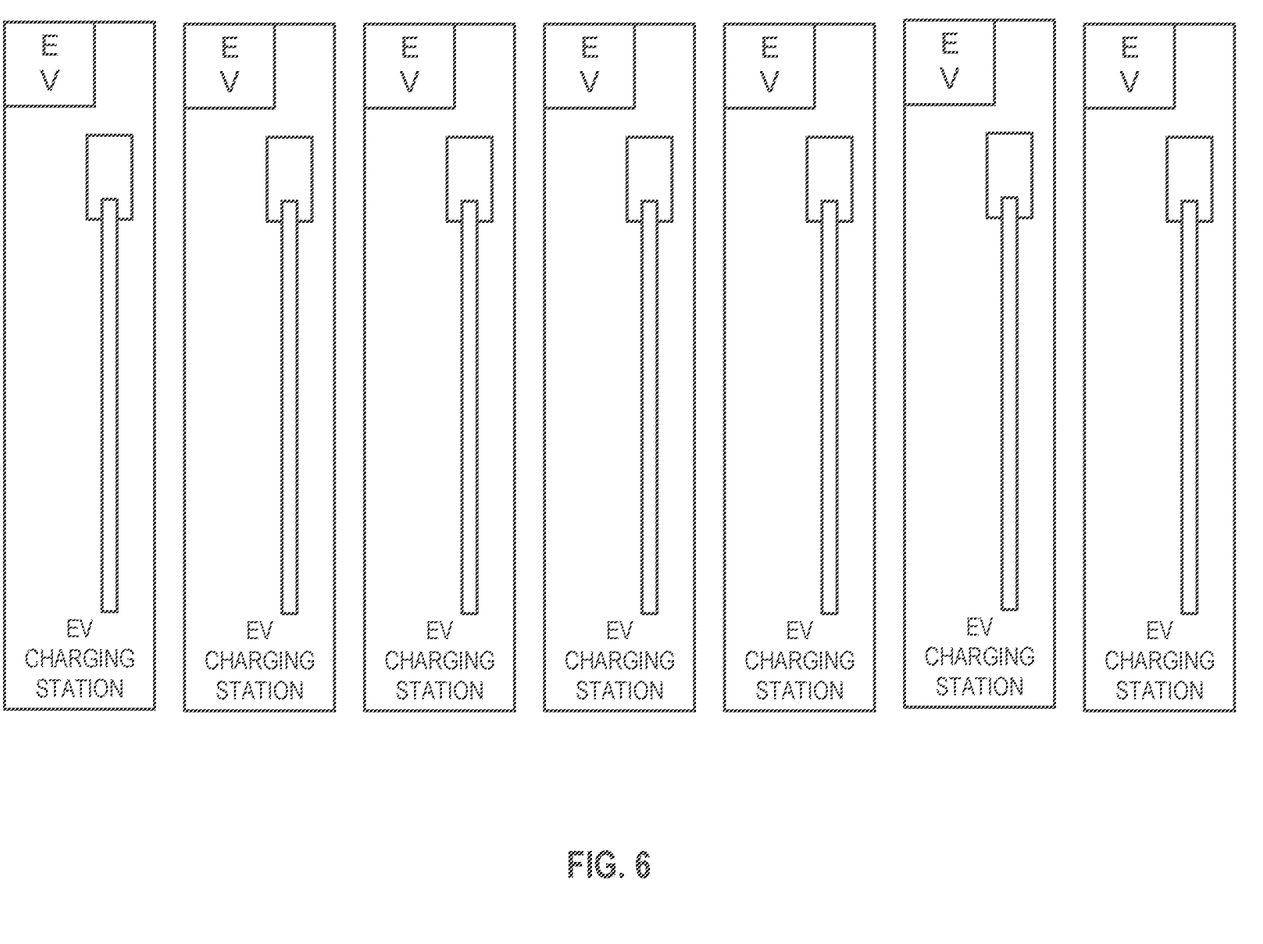
FIG. 6 shows an example EV charging stations for multiple EVs.

FIG. 6 shows an example EV charging stations for multiple EVs. In this example, no EVs are shown. Other example EV charging stations may only include two (2) EV charging stations and additional parking for those waiting to charge their vehicles. Once the EV charging stations are being used by an EV, if there are not any EV charging stations available for another user, that user must wait for an opening. This may entail checking the EV charging stations periodically, which can waste time. Considering that many EVs are limited in distance they can drive based on battery charge, some users may not be able to proceed on their next destination until their turn to charge their EV.

Figure 7:
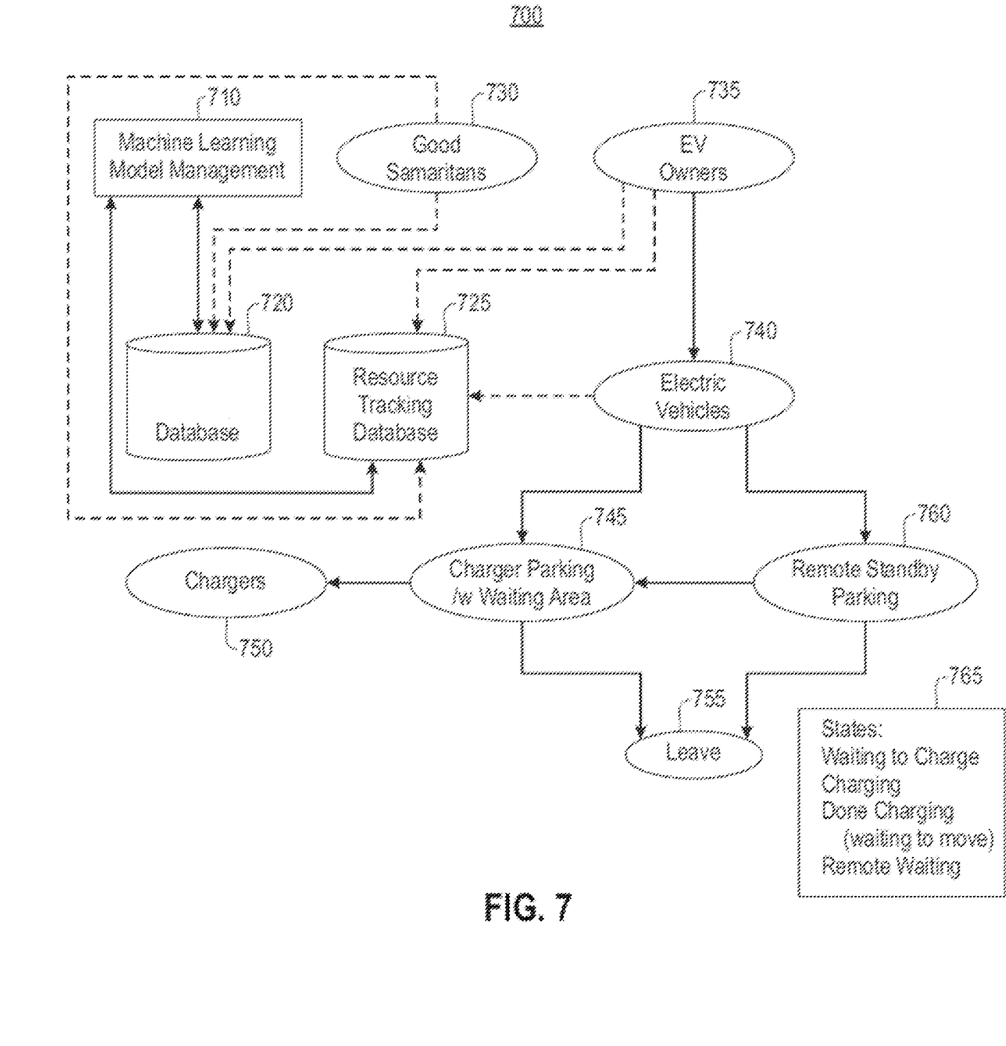
FIG. 7 shows an architecture for a system for EV charging including optimization based on predictive analytics utilizing ML, according to one embodiment.

FIG. 7 shows an architecture for a system 700 for EV charging including optimization based on predictive analytics utilizing ML, according to one embodiment. In one embodiment, the architecture for system 700 includes ML model management processing 710, a database 720, a resource tracking database 725, one or more good samaritans 730, EV owners 735, EVs 740, charger parking (with an optional waiting area) 745, EV chargers 750, remote standby parking 760, leave indication 755 and EV charging states 765. In one embodiment, the charging states 765 may include waiting to charge, charging, done charging (waiting to move EV) and remote waiting.

In one embodiment, the EV chargers 750 are the actual desired resources that are accessible from the charger parking 745. The leave indication 755 provides an indication (e.g., a signal, a message, a communication, an alert, etc.) when an EV 740 leaves a tracked area (e.g., charger parking 745, remote standby parking 760, etc.). The remote standby parking 760 includes parking for EVs 740 waiting to move to the charger parking (or to the optional waiting area) 745. The charger parking (with optional waiting area) 745 are the areas where the EVs 740 are charging via the chargers 750, are waiting to charge, or have completed charging (waiting to be moved). The EVs 740 are tracked when in the remote standby parking 760, in the waiting area or at the charger parking 745.

In one embodiment, the EVs 740 are tracked in the resource tracking database 725 by license plate, make/model/year, make/model/year, battery capacity, etc. The resource tracking database 725 tracks both physical information on the EVs 740, the EV owners 735 and the good samaritans 730 by, for example, charging times by day of week, hour of day, etc., responsiveness after notification or alert, feedback on other EV owners 740, and information from others. In one embodiment, the resource tracking database 735 stores/maintains ML models on EVs 740. The EV owners 735 include the owners of tracked EVs 740. The EV owners 735 are tracked in in the resource database 725 by commute distance (e.g., miles, etc.), responsiveness (to notifications/alerts for availability of a charger 750, charging done, etc. The EV owners 735 are also tracked and/or managed with the database 720. The good samaritans 730 are either EV users or non-EV users that assist EVs 740 other than their own. The good samaritans 730 are tracked in the resource database 725 for information provided, such as identity or EV charging state 765 change for EVs 740. The good samaritans 730 are also tracked and/or managed with the database 720.

In one embodiment, the database 720 stores ML models on the EV owners 735 as well as the good samaritans 730. The ML model management processing 710 uses data gathered within the resource tracking database 725 and the database 720, and updates (trains/re-trains) and uses an ML model to maintain a score for EV owners 735 and good samaritans 730. In one embodiment, the ML models for the users are stored in the database 720.

In some embodiments, the system 700 uses the derivable benefits attainable from the utilization of data collected from a connected EV 740 charging system at a facility and its user community (e.g., EV owners 735 or non-owner users). Additionally, system 700 processing may be used with EV charging facilities that do not require sign-in prior to activation as this restricts the activator to be the EV owner 735 or an agent of the owner, such as a valet. In one embodiment, the benefits attained are derived by EV users needing a charge who cannot immediately plug-in their EVs due to capacity already met. The system 700 provides ML model prediction of a likely start time for a charging session on a given day, and if multiple "queued" parking spots are available the system 700 identifies the one with the most probable early availability. In one embodiment, the traditional notification of an owner of completed EV 740 charge sessions, the system 700 also notifies "queued" EV owners 735 to provide them to possibly move the EV plug. In one embodiment, a user interface (UI) is implemented in an application (or app), a browser, etc. for users to interface with the architecture of system 700.

Figure 8:
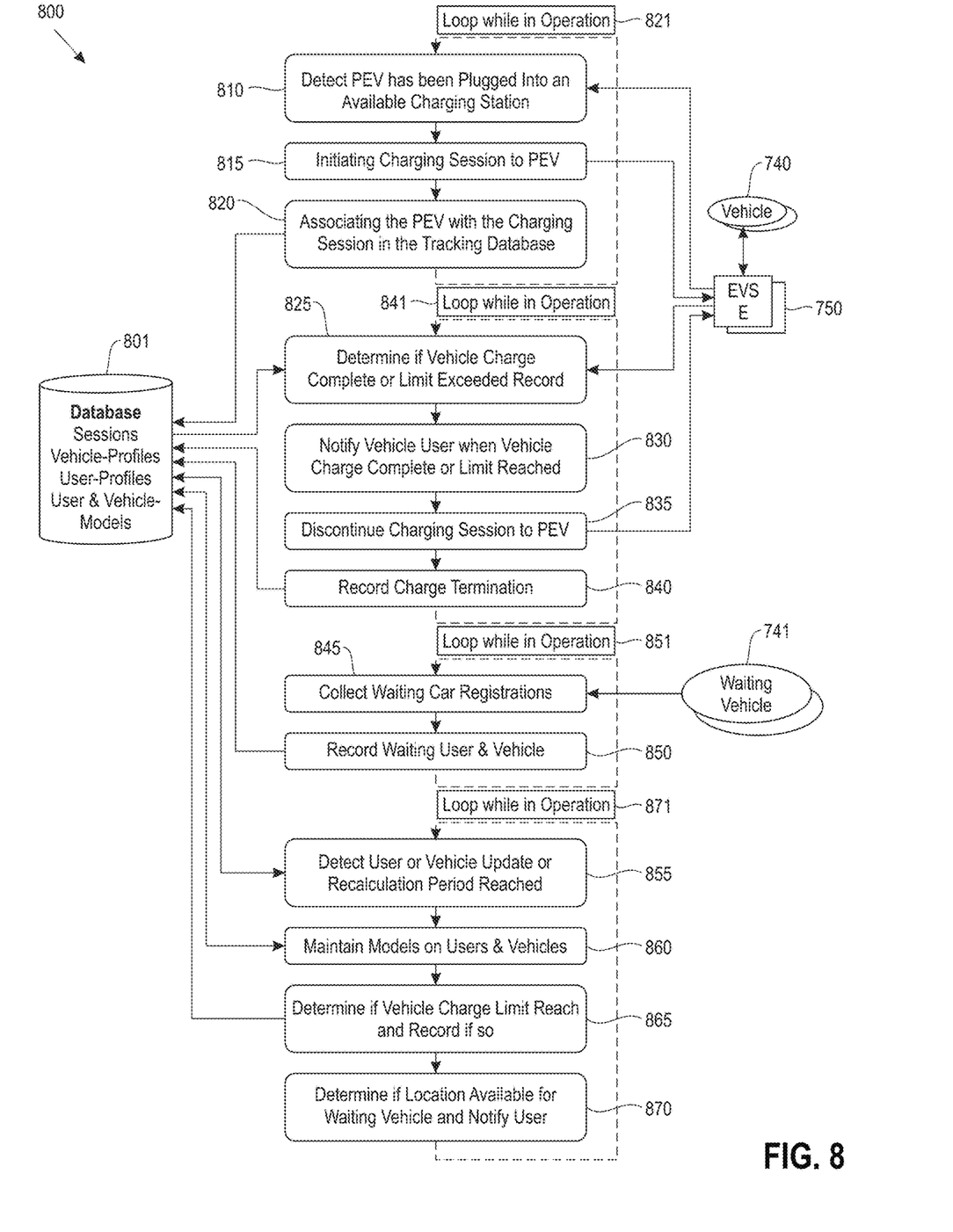
FIG. 8 shows a block diagram for a process for EV charging including optimization based on predictive analytics utilizing ML, according to one embodiment.

FIG. 8 shows a block diagram for a process 800 for EV charging including optimization based on predictive analytics utilizing ML, according to one embodiment. In one embodiment, an implementation of a connected PEV charging system includes a set of EV chargers 750 (FIG. 7), such as the CLIPPERCREEK™ (hardwired charging station) HCS-40R systems, with additional hardware employed to monitor charging states 765 (FIG. 7) and send state change events to a central recording center database 801, e.g., an IBM Cloud database management system (DBMS) that provides query functionality. Some EV charging vendors (e.g. CHARGEPOINT®) offer a pre-built system that performs data collection to central recording center. Such systems, however, often require a registration (utilizing radio frequency identification (RFID) or a mobile device application) before a session activation and also have optional fee processing. Further, such third party systems have either monthly fees for the facility and/or EV charging fees for their users. Standard level 2 charging (minimum 208-240V (volt) AC (alternating current) and J1772 plug) does not provide vehicle identification information to EV chargers upon connection. Conventional EV charging station communications are limited to the charging providing information on voltage and amperage limits and the PEV requesting a specific amperage capacity as the charging session begins. Level 3 (or DC Fast Charging) systems have a more extensive protocol that can provide vehicle identification information.

In one embodiment, in block 810, process 800 detects that a PEV has been plugged into an available EV charging station by leveraging onboard status sensors and application programming interfaces (APIs) typically provided by commercial charging stations. Status information provided may include: charge rate, vehicle identification number (VIN), charge start time, etc. In block 815 process 800 initiates a charging session to the PEV based on the detection in block 810. In block 820, process 800 associates the PEV with the charging session in the tracking database 801, which includes session information, PEV profiles, user profiles, user ML models and vehicle ML models. In one embodiment, a PEV profile may include a collection of settings, information and preferences associated with the PEV owner and the PEV. The PEV profile is considered an explicit digital representation of the identity of the user with respect to the charging system environment(s), which could include operating systems, software applications, websites, etc. The PEV profile helps in associating characteristics with a user and helps in ascertaining the interactive behavior of the user along with the preferences and characteristics.

In one embodiment, the process 800 (and system 700, FIG. 7) relies on having sessions identified to specific PEVs. One embodiment employs a pre-activation registration process, but with less "enforced" embodiment systems activation occurs by plugging in the PEV to a charging station and then the system depends on the PEV owner (or other community members) to later declare their usage to identify their EV by, for example license plate number, and associate this information with the active charging session. Alternatively, an automatic license plate recognition/reading system utilizing optical character recognition (OCR) may be available at the site. A deficiency of pre-activation registration systems is that they do not allow for other than the PEV owner to start a session (e.g., valet, loaned vehicle, another driver, etc.). This prevents both the PEV owner vacating a spot and a conscience third party (e.g., good Samaritans 730, FIG. 7) who notice one PEV at a charging station has completed charging and is preventing a waiting vehicle 741 from "plugging-in." In one embodiment, process 800 (and system 700) rely on having an association of a user to a PEV for notification purposes as well as profiling. In some embodiments, the association is normally done via an on-line registration process in the case of PEV owners, but can be an ad-hoc assignment in cases of "loaner" vehicles, etc. In one embodiment, process 800 includes a loop 821 that returns from block 820 back to block 810 if process 800 does not detect that a PEV has been plugged into an available charging station.

Queued charging station locations are common where two EV charging stations may have three parking locations allowing "charge waiting cars to queue." Process 800 (and system 700) can suggest optimal waiting locations. Knowing the availability of the waiting location, however, would rely on user sign-in when waiting or an automatic car detection by means of sensors (e.g., RFID, etc.) or computer vision techniques (i.e., enabling computers to see via cameras, identify and process images in a similar way that human vision does, and then provide appropriate output). In one embodiment, in block 825, process 800 determines if an EV charge is complete (e.g., charging capacity of the EV has been reached) or if a charging time limit has been reached (e.g., a preset time limit, etc.). In block 830, process 800 notifies (e.g., an audio or visual alert, a text message, an email, a smart phone app alert via sound, haptic, etc.) an EV user when the EV charging is complete or the time limit has been reached. In block 835, process 800 discontinues the charging session to the PEV and records the charge termination in block 840. In one embodiment, process 800 includes a loop 841 that returns from block 840 back to block 825 if process 800 does not determine that the charging of an EV is completed or the time limit for charging has been reached. In one embodiment, in block 845, process 800 collects waiting vehicle 741 car registration information for charging. The registration information may include information such as EV make/model/year, battery size, license plate number, commute distance (e.g., if in a workplace setting, etc.), etc. The information may be arranged in a PEV profile that may be amended by the owner, created, or generated by crawling techniques or other progressive or active data collection techniques. In block 850, process 800 records the waiting user and waiting vehicle 741 registration information in the database 801. In one embodiment, process 800 includes a loop 851 that returns from block 850 back to block 845 for repeating blocks 845 and 850.

In one embodiment, in block 855, process 800 detects a user or vehicle update, or if a recalculation period has been reached (e.g., a preset time period). In block 860 process 800 maintains the ML models on the users and vehicles (i.e., ML model updates, training/retraining, etc.). In block 865, process 800 determines if a vehicle charge limit has been reached (e.g., the current charge capacity has been reached, a predetermined charge capacity as been reached, etc.), and if so, records the information in the database 801. In block 870, process 800 determines location available for a waiting vehicle 741 and notifies the user (e.g., an audio or visual alert, a text message, an email, a smart phone app alert via sound, haptic, etc.). In one embodiment, process 800 includes a loop 871 that returns from block 850 back to block 855 for repeating blocks 855, 860, 865 and 870.

In one embodiment, process 800 employs a state-of-the-art scheduling model that uses ML processing. The scheduling ML model includes: (i) a component to predict the charging time for all users using the charging stations at the moment (e.g., predicts remaining charging time for the vehicle); (ii) a component that ranks the waiting users, and outputs a schedule for the system 700 (FIG. 7). In one embodiment, to train the "charging time" prediction component of the scheduling ML model, the process 800 captures the charging time of each EVs 750 and the features of the EV. Once enough data is collected (e.g., N uses of the charging station, where N is a predefined number, such as 10, 100, 1000, etc.), the ML scheduling model is trained on the collected data (e.g., stored in the database 801). In some embodiments, several regression models are trained, i.e., using linear regression, polynomial regression and KNN (K-nearest neighbor), and the final prediction (ML model output) is the average of the individual predictions. The ML scheduling model uses the EV features as well as the past charging times of the EV to predict the current charging time. In one embodiment, a split (e.g., 80/20, etc.) is used to train and evaluate the data. Once the performance of the ML scheduling model is above a user defined threshold (e.g., 80%), the ML scheduling model can be used in the process 800 (and system 700). As new data comes in for process 800 (and system 700), the ML scheduling model is retrained. Thus, the ML scheduling model can easily capture changes in data and user behavior (e.g., promptness, tardiness, ending a charging session early/late, moving an EV, etc.).

In one embodiment, the ML scheduling model takes on input of the users waiting in line (queue) and all the EVs that are already being charged. In some embodiments, the previous information is used to predict the charging time of all the EVs currently being charged and the cars in the queue. Based on the predicted charging times and user features, the ML scheduling model ranks the users in line and assigns each user a charging station. To do so, the ML scheduling model uses an ML ranking, which ranks the users based on their features, the expected charging time of their EV and the EVs that are currently charging. In one embodiment, the process 800 may be implemented in an application (or app), a browser, etc. for users to interface with the process 800 using the architecture of system 700 (FIG. 7).

Figure 9:
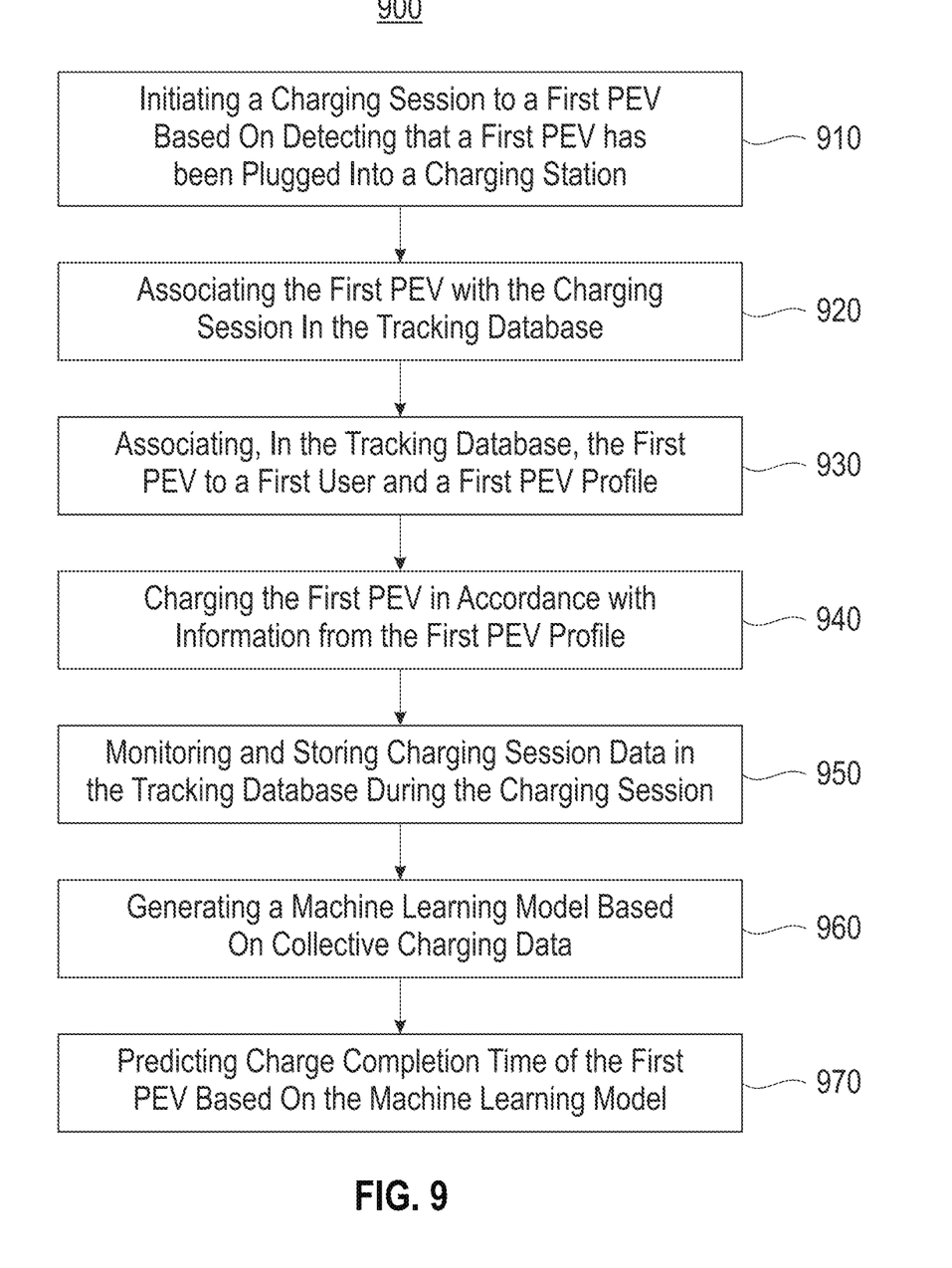
FIG. 9 illustrates a block diagram of another process for EV charging including optimization based on predictive analytics utilizing ML processing, according to one embodiment.

FIG. 9 illustrates a block diagram of a process 900 for EV charging including optimization based on predictive analytics utilizing machine learning processing, according to one embodiment. In one embodiment, process 900 is sued for managing charging resources of a charging system (e.g., system 700, FIG. 7) for PEVs, where the charging system includes a central recording center (e.g., database 801, FIG. 8) including a tracking database (e.g., resource tracking database 725, FIG. 7). In one embodiment, in block 910, process 900 initiates a charging session to a first PEV based on detecting that a first PEV has been plugged into a charging station (e.g., chargers 750, FIG. 7; e.g., by using a computing device such as from computing node 10, FIG. 1, hardware and software layer 60, FIG. 2, processing system 300, FIG. 3, system 400, FIG. 4, system 500, FIG. 5, architecture 700, FIG. 7, etc.). In block 920, process 900 further associates the first PEV with the charging session in the tracking database. In block 930, process 900 further associates, in the tracking database, the first PEV to a first user and a first PEV profile. In block 940, process 900 additionally provides charging the first PEV in accordance with information from the first PEV profile. In block 950, process 900 further provides for monitoring and storing charging session data in the tracking database during the charging session. In block 950, process 900 further provides generating a machine learning model based on collective charging data. In block 960, process 900 provides for predicting charge completion time of the first PEV based on the machine learning model.

In one embodiment, process 900 may further include the feature that the information of the first PEV profile comprising identifying data and technical information needed for activating and managing charging operations.

In one embodiment, process 900 may additionally include the feature that the identifying data comprises license plate number or manufacturer vehicle identification number; and the technical information comprises PEV: manufacturer, model, year, and battery size.

In one embodiment, process 900 may still additionally include the feature that forming the collective charging data based on associating the charging session data with similar data (e.g., from comparing, clustering, pattern matching, etc.) stored in previous charging sessions of additional PEVs having characteristics similar to the first PEV profile.

In one embodiment, process 900 may yet additionally include the feature of notifying the first user of the predicted charge completion time of the first PEV.

In one embodiment, process 900 may further include the feature of collecting user behavior information; and rewarding some users with early notification of charging station availability and optimal waiting location identification; wherein the user is a car owner.

In one embodiment, process 900 may still further include the feature of notifying a second user of predicted availability of the charging station based on the predicted charge completion time of the first PEV.

In one embodiment, process 900 may include the feature that the notifying further identifies a parking location having a predicted earliest probable availability for the charging station.

Some embodiments significantly provide benefits for EV users needing a charge who cannot immediately plug-in their EVs due to EV charging capacity already being met. Some features contribute to the advantage of significantly improving the efficiency of charging for EV users using ML models. Some other features contribute to the advantage of optimizing usage of charging systems that are limited to a few charging stations (e.g., two, four, etc.) with a number of EVs that use the charging stations outnumbering the number of charging stations.

One or more embodiments may be a system, a method, and/or a computer program product at any possible technical detail level of integration. The computer program product may include a computer readable storage medium (or media)

having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C.

section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method for managing charging resources of a charging system for plug-in electric vehicles (PEVs), the charging system including a central recording center comprising a tracking database, the method comprising:
    initiating a charging session to a first PEV based on detecting that the first PEV has been plugged into a charging station;
    associating the first PEV with the charging session in the tracking database; associating, in the tracking database, the first PEV to a first user and a first PEV profile;
    charging the first PEV in accordance with information from the first PEV profile comprising identifying data and technical information needed for activating and managing charging operations;
    monitoring and storing charging session data in the tracking database during the charging session;
    tracking users based on responsiveness after notification of an available charging station, and feedback on other PEV owners;
    rewarding some users with early notification of charging station availability and optimal waiting location identification;
    generating a machine learning model based on collective charging data, wherein the machine learning model comprises a plurality of trained regression models including a linear regression model, a polynomial regression model and a K-nearest neighbor (KNN) model; and
    predicting charge completion time of the first PEV based on an average of outputs from the linear regression model, the polynomial regression model, and the K-nearest neighbor (KNN) model;
    wherein the identifying data comprises license plate number and manufacturer vehicle identification number, and the technical information comprises PEV: manufacturer, model, year, and battery size.

2. The method of claim 1, further comprising:
    forming the collective charging data based on associating the charging session data with similar data stored in previous charging sessions of additional PEVs having characteristics similar to the first PEV profile.

3. The method of claim 2, further comprising:
    notifying the first user of the predicted charge completion time of the first PEV.

4. The method of claim 1, further comprising:
    notifying a second user of predicted availability of the charging station based on the predicted charge completion time of the first PEV.

5. The method of claim 4, wherein the notifying further identifies a particular parking location having a predicted earliest probable availability for a start time for using the charging station from a plurality of queued parking locations.

6. A computer program product for managing charging resources of a charging system for plug-in electric vehicles (PEVs), the computer program product comprising a computer readable storage medium having program instructions embodied therewith, the program instructions executable by a processor to cause the processor to:
    initiating a charging session to a first PEV based on detecting, by the processor, that the first PEV has been plugged into a charging station;
    associating, by the processor, the first PEV with the charging session in a tracking database;
    associating, by the processor, in the tracking database, the first PEV to a first user and a first PEV profile;
    charging the first PEV in accordance with information from the first PEV profile comprising identifying data and technical information needed for activating and managing charging operations;
    monitoring and storing, by the processor, charging session data in the tracking database during the charging session;
    tracking, by the processor, users based on responsiveness after notification of an available charging station, and feedback on other PEV owners;
    rewarding some users, by the processor, with early notification of charging station availability and optimal waiting location identification;
    generating, by the processor, a machine learning model based on collective charging data, wherein the machine learning model comprises a plurality of trained regression models including a linear regression model, a polynomial regression model and a K-nearest neighbor (KNN) model; and
    predicting, by the processor, charge completion time of the first PEV based on an average of outputs from the linear regression model, the polynomial regression model, and the K-nearest neighbor (KNN) model;
    wherein the identifying data comprises license plate number and manufacturer vehicle identification number, and the technical information comprises PEV: manufacturer, model, year, and battery size.

7. The computer program product of claim 6, wherein the program instructions executable by the processor further cause the processor to:
    form, by the processor, the collective charging data based on associating the charging session data with similar data stored in previous charging sessions of additional PEVs having characteristics similar to the first PEV profile.

8. The computer program product of claim 7, wherein the program instructions executable by the processor further cause the processor to:
    notify, by the processor, the first user of the predicted charge completion time of the first PEV.

9. The computer program product of claim 6, wherein:
    the program instructions executable by the processor further cause the processor to:
        notify, by the processor, a second user of predicted availability of the charging station based on the predicted charge completion time of the first PEV; and
        the notification identifies a particular parking location having a predicted earliest probable availability for a start time for using the charging station from a plurality of queued parking locations.

10. An apparatus comprising:
    a memory configured to store instructions; and
    a processor configured to execute the instructions to:
        initiate a charging session to a first PEV based on detecting that the first PEV has been plugged into a charging station in a charging system;
        associate the first PEV with the charging session in a tracking database; associate, in the tracking database, the first PEV to a first user and a first PEV profile;
        charging the first PEV in accordance with information from the first PEV profile comprising identifying data and technical information needed for activating and managing charging operations;
        monitor and store charging session data in the tracking database during the charging session;
        track users based on responsiveness after notification of an available charging station, and feedback on other PEV owners;
        reward some users with early notification of charging station availability and optimal waiting location identification;
        generate a machine learning model based on collective charging data, wherein the machine learning model comprises a plurality of trained regression models including a linear regression model, a polynomial regression model and a K-nearest neighbor (KNN) model; and
        predict charge completion time of the first PEV based on an average of outputs from the linear regression model, the polynomial regression model, and the K-nearest neighbor (KNN) model;
            wherein the identifying data comprises license plate number and manufacturer vehicle identification number, and the technical information comprises PEV: manufacturer, model, year, and battery size.

11. The apparatus of claim 10, wherein the processor is further configured to execute the instructions to:
    form the collective charging data based on associating the charging session data with similar data stored in previous charging sessions of additional PEVs having characteristics similar to the first PEV profile; and
    notify the first user of the predicted charge completion time of the first PEV.

12. The apparatus of claim 10, wherein:
    the processor is further configured to execute the instructions to:
        notify a second user of predicted availability of the charging station based on the predicted charge completion time of the first PEV; and
        the notification identifies a particular parking location having a predicted earliest probable availability for a start time for using the charging station from a plurality of queued parking locations.

* * * * *